(12) United States Patent
Wang et al.

(10) Patent No.: US 8,228,447 B2
(45) Date of Patent: Jul. 24, 2012

(54) IMAGE DISPLAY MODULE

(75) Inventors: Wei-Jen Wang, Taipei Hsien (TW);
Shao-Hung Wang, Taipei Hsien (TW)

(73) Assignee: Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 1087 days.

(21) Appl. No.: 12/131,129

(22) Filed: Jun. 2, 2008

(65) Prior Publication Data

US 2009/0103255 A1    Apr. 23, 2009

(30) Foreign Application Priority Data

Oct. 19, 2007    (CN) .......................... 2007 1 0202171

(51) Int. Cl.
*H04N 5/64* (2006.01)

(52) U.S. Cl. ...................... 348/838; 345/169; 455/575.4

(58) Field of Classification Search .................. 348/838, 348/825; 361/679.21, 679; 345/169; 455/575.1, 455/575.4
See application file for complete search history.

(56) References Cited

U.S. PATENT DOCUMENTS

| | | | |
|---|---|---|---|
| 6,128,475 A * | 10/2000 | Wicks et al. | 455/575.4 |
| 6,243,595 B1 * | 6/2001 | Lee et al. | 455/566 |
| 6,963,756 B2 * | 11/2005 | Lubowicki et al. | 455/550.1 |
| 7,400,916 B2 * | 7/2008 | Lee et al. | 455/575.4 |
| 7,558,057 B1 * | 7/2009 | Naksen et al. | 361/679.56 |
| 7,995,333 B2 * | 8/2011 | Li | 361/679.21 |
| 2003/0171133 A1 * | 9/2003 | Mizuta et al. | 455/550 |
| 2005/0032557 A1 * | 2/2005 | Brunstrom et al. | 455/575.1 |
| 2005/0054397 A1 * | 3/2005 | Kim et al. | 455/575.4 |
| 2005/0233785 A1 * | 10/2005 | Park et al. | 455/575.4 |
| 2005/0245297 A1 * | 11/2005 | Lee et al. | 455/575.4 |
| 2009/0109131 A1 * | 4/2009 | Wang et al. | 345/31 |

* cited by examiner

*Primary Examiner* — Branon Painter
(74) *Attorney, Agent, or Firm* — Altis Law Group, Inc.

(57) ABSTRACT

An image display module adapted for displaying an image in an electronic device, includes a bottom cover, a sliding portion movably mounted on the bottom cover, a screen received in the bottom cover, an upper cover fastened and aligned to the bottom cover, and a sensor arranged on the upper cover. An opening is defined in the upper cover for exposing the screen and displaying images captured by the electronic device. The sliding portion can move from a first position to a second position relative to the bottom cover. When the sliding portion is at the first position, the sliding portion is away from the sensor, the opening is partially covered and a part of the screen is exposed for displaying images. When the sliding portion moves to the second position relative to the bottom cover, the sliding portion engages the sensor, and the screen is fully exposed for displaying images.

3 Claims, 6 Drawing Sheets

IMAGE DISPLAY MODULE

BACKGROUND

1. Field of the Invention

The present invention relates to image display modules, particularly to an image display module used in a portable electronic device such as a digital camera.

2. Description of the Related Art

With the development of optical and digital imaging technologies, camera devices have become widely used in electronic devices such as digital cameras and digital camcorders.

In a typical image display module installed in a digital device, such as a digital camera, the display panel or the screen has a fixed aspect ratio of 4:3. When a user wants to use a wide screen mode i.e., at aspect ratio of 16:9 in the camera, the images cannot be displayed on the screen in their entirety due to the screen's fixed 4:3 aspect ratio.

To overcome the above problem, some image display modules are designed to have an aspect ratio of 16:9. However, to display an image with the same resolution, a screen of aspect ratio 16:9 has to be larger than a screen with an aspect ratio of 4:3. Therefore, an image display module with a 16:9 aspect ratio screen tends to be larger in size than the one with a 4:3 aspect ratio screen, which undesirably leads to larger size portable electronic devices with the image display module installed therein.

What is needed, therefore, is an improved image display module which can overcome the above mentioned problems.

SUMMARY

An image display module adapted for displaying an image in a portable electronic device is provided. The image display module includes a bottom cover, a sliding portion movably mounted on the bottom cover, a screen received in the bottom cover, an upper cover aligned to the bottom cover, and a sensor mounted on the upper cover. An opening is defined in the upper cover for exposing the screen and displaying the image captured by the electronic device. The sliding portion can move from a first position to a second position relative to the bottom cover. When the sliding portion is at the first position, the sliding portion is away from the sensor, the opening is partially covered and so is the screen, and only a portion of the screen is viewable for displaying the image. When the sliding portion moves to the second position relative to the bottom cover, the sliding portion engages the sensor, and the screen is fully exposed for displaying images.

Other advantages and novel features of the present invention will become more apparent from the following detailed description when taken in conjunction with the accompanying drawings.

DETAILED DESCRIPTION OF THE EMBODIMENTS

Figure 1:
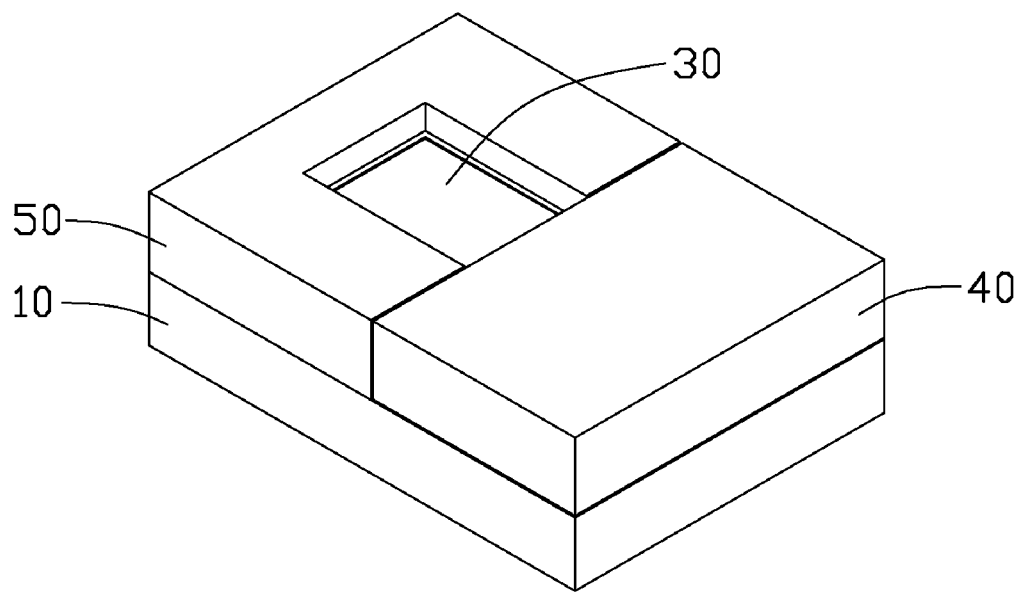
FIG. 1 is an isometric, assembled view of an image display module in accordance with an exemplary embodiment of the present invention, wherein a sliding portion of the image display module is at a first position.
Figure 3:
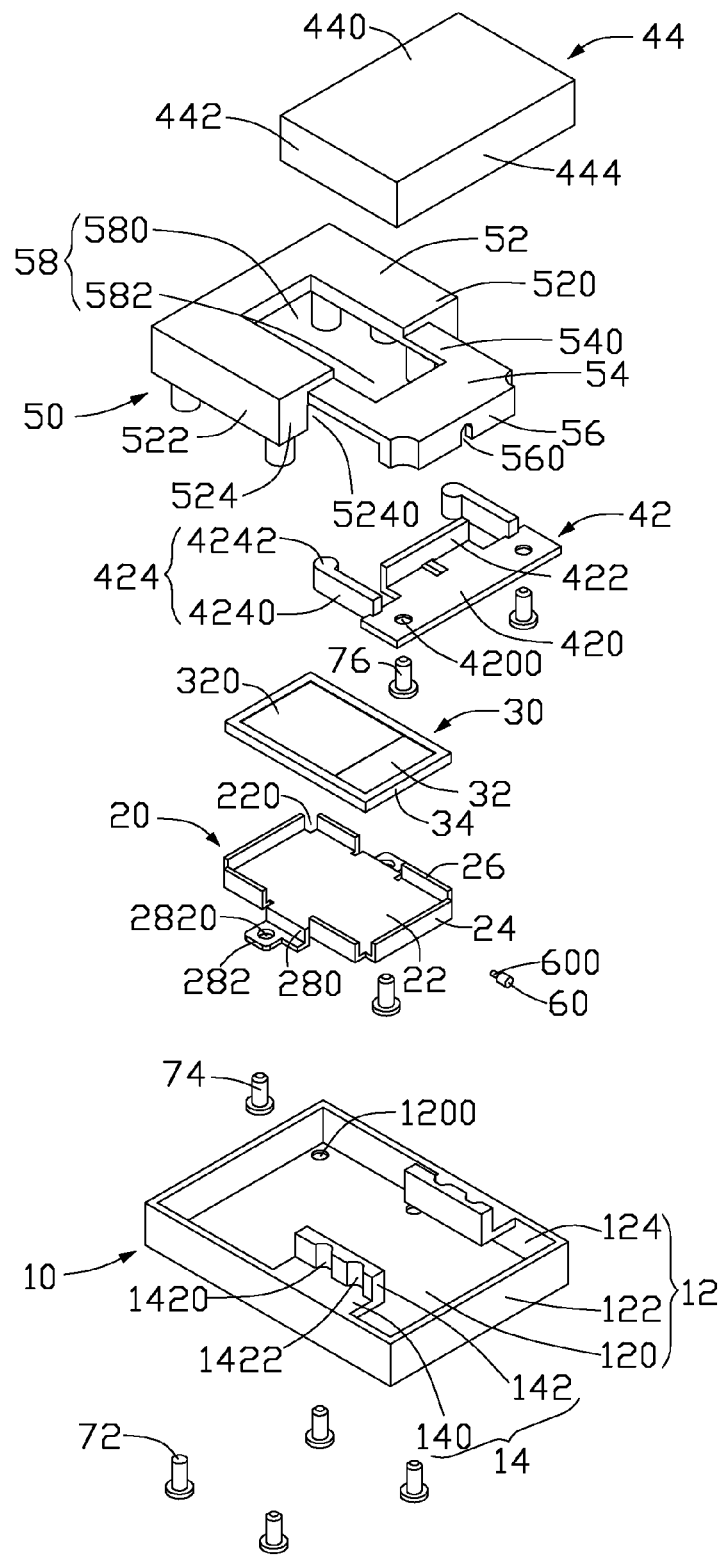
FIG. 3 is an isometric, exploded view of the image display module in FIG. 1.

Referring to FIG. 1 and FIG. 3, an image display module in accordance with an exemplary embodiment of the present invention is shown. The image display module is used in an electronic device such as a digital camera (not shown) for displaying images captured by the camera or stored in the camera. The image display module includes a bottom cover 10, a socket 20 mounted in the bottom cover 10, a screen 30 fastened in the socket 20, a sliding portion 40 movably mounted on the bottom cover 10, an upper cover 50 fastened to the bottom cover 10, and a sensor 60 fixed in the upper cover 50. The sliding portion 40 includes a sliding element 42 and an operating element 44, with a shield 54 of the upper cover 50 sandwiched therebetween.

The bottom cover 10 comprises a frame 12, and two arms 14 formed on two opposite sides of the frame 12. The frame 12 comprises a rectangular board 120 and peripheral walls 122 and 124, extending upwardly from edges of the board 120. Two holes 1200 are defined in two corners at one end of the board 120 respectively, and another two holes 1200 are defined close to two longitudinal edges of the board 120 and aligned substantially on the line formed by the two middle points of the longitudinal edges of the board 120. The four holes 1200 allow screws 72 to be inserted therethrough to fasten the upper cover 50 onto the bottom cover 10. The two arms 14 extend inwardly from the tops of the two opposite peripheral walls 124 respectively. The two arms 14 are spaced apart from the board 120. Each arm 14 includes a hanging portion 140 extending horizontally from the top of the peripheral wall 124, and a conducting portion 142 extending upwardly from a free end of the hanging portion 140. The hanging portion 140 and the conducting portion 142 are substantially rectangular prisms. Two grooves 1420, 1422 are defined in an outer surface of each conducting portion 140. The grooves 1420, 1422 are parallel to each other and elongated along a perpendicular direction. The grooves 1420, 1422 are used for receiving a corresponding element of the sliding portion 40 to securely position the sliding portion 40 at a first position or a second position.

The socket 20 is mounted in the frame 12 of the bottom cover 10. The socket 20 includes a rectangular board 22 and four peripheral walls 24, 26 extending upwardly from edges of the board 22. The area of the board 22 of the socket 20 is smaller than that of the board 120 of the bottom cover 10. The width of the board 22 of the socket 20 is similar to the space between the two conducting portions 142 of the two arms 14, measuring from the two inner sides of the two conducting portions 142, for the socket 20 to be fittingly received in the frame 12 and sandwiched between the two arms 14. Each corner where a pair of adjacent peripheral walls 24 and 26 meet is cut to define a slot 220. Two supporting plates 280 extend downwardly from the board 22, the supporting plates 280 being formed at the middle portions of the two peripheral walls 26 respectively. Two supporting ears 282 extend outwardly and horizontally from ends of the two supporting plates 280 respectively. An opening 2820 is defined in each of the supporting ears 282 for a screw 74 to pass therethrough and fasten the socket 20 onto the upper cover 50.

The area of the screen 30 is similar to that of the board 22 of the socket 20, for the screen 30 to be fittingly received in the socket 20. The screen 30 includes a panel 32, and a frame 34 surrounding the panel 32. The panel 32 is rectangular and has an aspect ratio of 16:9. An inner panel 320 is defined from one end of the panel 32. The inner panel 320 has an identical width with the panel 32, and a length of the inner panel 320 is ¾ of that of the panel 32. In other words, the aspect ratio of the inner panel 320 is 4:3. The panel 32 connects with a circuit (not shown) to display images in the whole panel 32 or connects the sensor 60 with the circuit to display images only in the inner panel 320. The frame 34 of the screen 30 is used to abut against the upper cover 50 to secure the screen 30 between the upper cover 50 and the socket 20.

Figure 5:
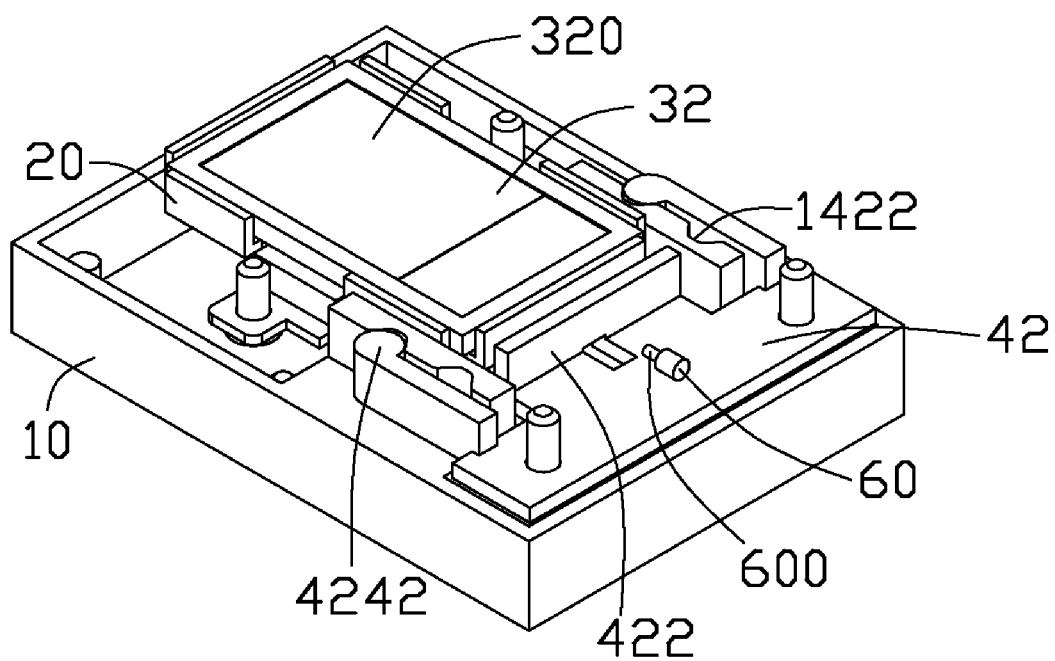
FIG. 5 is an isometric, assembled view of the image display module in FIG. 1, but not showing an upper cover and an operating element of the sliding portion.

Also referring to FIG. 5, the sliding element 42 of the sliding portion 40 is movably mounted on the bottom cover 10. The sliding element 42 includes a body 420, two locking blocks 424 extending from two ends of the body 420 respectively, and a positioning plate 422 extending upwardly from the rear side of the body 420 and located between the two locking blocks 424. The body 420 is flat and located on a front portion of the bottom cover 10. The length of the body 420 is similar to the space between the two opposite peripheral walls 124 of the bottom cover 10. The width of the body 420 is similar to the space between a front side of the arms 14 and the front peripheral wall 122. Corresponding to the positions of the two locking blocks 424, two holes 4200 are defined at the two ends of the body 420 respectively for the screws 76 to pass therethrough and mount the sliding element 42 onto the operating element 44. The width of the positioning plate 422 is similar to the space between the two arms 14 for the plate 422 received between the two arms 14.

Figure 6:
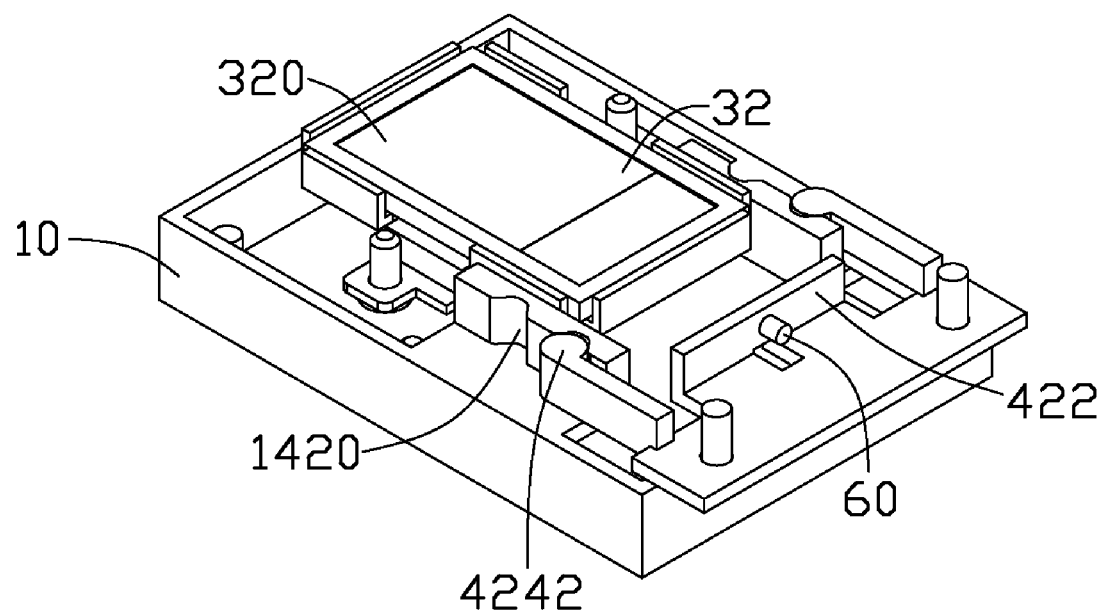
FIG. 6 is an isometric, assembled view of the image display module in FIG. 2, but not showing the upper cover and the operating element of the sliding portion.

The locking blocks 424 can position the sliding portion 40 at two positions, i.e. the first position (as shown in FIG. 5) and the second position (as shown in FIG. 6). At the first position, the screen 32 in FIG. 3 is exposed at one aspect ratio, and at the second position, at another aspect ratio. The plate 422 can move with the sliding element 42 to the second position to trigger the sensor 60 so as to complete the circuit and use the whole panel 32 to display images at the aspect ratio of 16:9. The height of the two locking blocks 424 is similar to that of the two conducting portions 142 of the arms 14. Each of the locking blocks 424 includes a leg 4240 extending from one of the ends of the body 420, and a bulge 4242 formed at an end of the leg 4240. The bulges 4242 are substantially columnar and extend inwardly toward each other. The bulges 4242 can be fittingly received in the grooves 1420 or alternatively in the grooves 1422 of the arms 14. When the bulges 4242 of the sliding element 42 slide into the grooves 1420, the sliding portion 40 is at the first position, as shown in FIG. 5. When the bulges 4242 of the sliding element 42 slide into the grooves 1422, the sliding portion 40 is at the second position as shown in FIG. 6.

Figure 4:
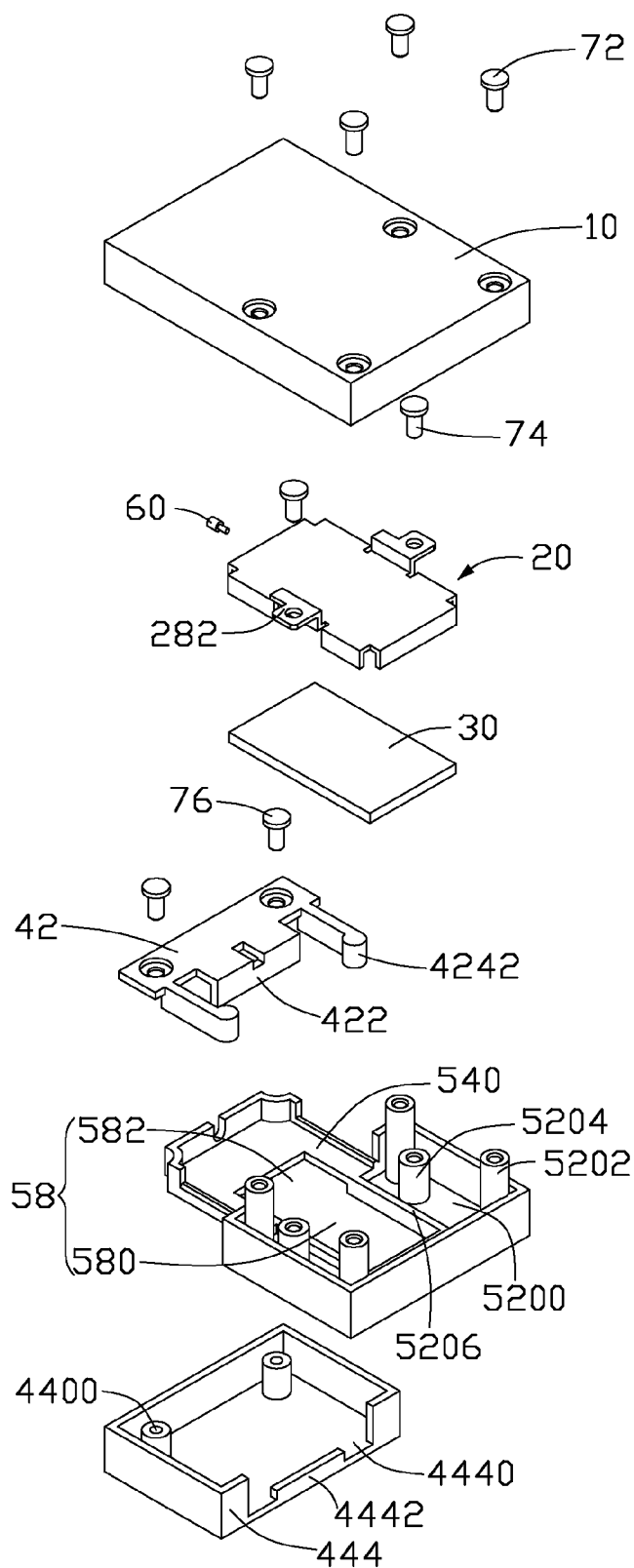
FIG. 4 is an inverted view of the image display module in FIG. 3.

Also referring to FIG. 4, this shows an inverted view of the image display module, with the upper cover 50 covering the bottom cover 10. The upper cover 50 includes a substantially rectangular frame 52 and a shield 54 formed in front of the frame 52. The frame 52 has a board 520 and four peripheral walls 522, 524 extending downwardly from edges of the board 520.

An opening 58 is defined at a middle portion of the upper cover 50 and corresponding to the panel 32 of the screen 30. The opening 58 includes a first portion 580 defined in a front portion of the board 520 and corresponding to the inner panel 320 of the screen 30, and a second portion 582 defined in the rear portion of the shield 54 and located between the two guiding rails 540. A bar 5206 is formed at a bottom surface of the board 520, and surrounds the first portion 580 of the opening 58. When the frame 34 of the screen 30 abuts against the bar 5206 of the frame 52 of the upper cover 50, the panel 32 is totally exposed out of the opening 58. Two channels 5200 are defined at the bottom surface of the board 520. The two channels 5200 are located at two lateral sides of the board 520, between the bar 5206 and one of the peripheral walls 522 respectively. Corresponding to the holes 1200 in the board 120 of the bottom cover 10 and the holes 2820 in the ears 282 of the socket 20, two positioning poles 5202 and one positioning pole 5204 extend down from each channel 5200. A threaded hole (not labeled) is defined in each of the poles 5202, 5204. The poles 5202, which are of the same height, are located at the two ends of the channel 5200 respectively. The poles 5202 abut against the board 120 of the bottom cover 10 for the screws 72 to pass therethrough and fasten the upper cover 50 onto the bottom cover 10. The poles 5204 are shorter than the poles 5202, and are located between but not aligned with the two corresponding poles 5202. The poles 5204 abut against the ears 282 of the socket 20 for the screws 74 to pass therethrough and fasten the socket 20 onto the upper cover 50. A middle portion of a front peripheral wall 524 is cut to define a rectangular slot 5240.

The shield 54 extends forward from the front peripheral wall 524; and a difference in height is defined between the top of the shield 54 and the top of the frame 52 for the operating element 44 to cover on the shield 54 to form a flat panel with the frame 52. The shield 54 comprises two guiding rails 540 at the rear portion thereof starting from the frame 52 for positioning the operating element 44, and a flange 56 extending downwardly from the front portion thereof. An orifice 560 in FIG. 3 is defined in the middle portion of the flange 56 for receiving the sensor 60 therein.

Further referring to FIG. 3, the operating element 44 is arranged on the shield 54 of the upper cover 50 and fixed with the sliding element 42 via the screws 76. A user can operate the operating element 44 to slide the sliding element 42 into the first or second positions. The operating element 44 includes a rectangular board 440, and four peripheral walls 442, 444 extending downwardly from edges of the board 440. Two poles 4400 extend from the bottom surface of the board 440, the poles 4400 being located at two front corners of the board 440 respectively. A threaded hole (not labeled) is defined in each of the poles 4400. The poles 4400 correspond to the holes 4200 in the body 420 of the sliding element 42, for the screws 76 to pass therethrough and fasten the sliding element 42 onto the operating element 44.

When the operating element 44 is at the first position, the board 440 of the operating element 44 and the board 520 of the upper cover 50 form a single plane with the first portion 580 of the opening 58 in the middle. The aerial shape of the plane can be substantially same as that of the board 120 of the bottom cover 10. Therefore, an assembled image display module has a substantially cuboid configuration (see FIG. 1). The middle portion of the rear peripheral wall 444 is cut to form a baffle 4442 and define a slot (not labeled) in the rear peripheral wall 444. The length of the baffle 4442 is similar to the width of the opening 58 of the upper cover 50. When the sliding portion 40 is at the first position, the baffle 4442 can shield a portion of the panel 32 to achieve an aesthetically pleasing configuration of the image display module. When the sliding portion 40 is at the second position, the baffle 4442 can stop the sliding of the sliding portion 40 by contact against the shield 54 of the upper cover 50 to prevent the operating element 44 from falling off from the upper cover 50. Two guiding grooves 4440 are defined at two flanks of the baffle 4442 for receiving the two guiding rails 540 of the shield 54 of the upper cover 50 therein respectively.

The sensor 60 has an inducing end 600. When the inducing end 600 of the sensor 60 engages the plate 422 of the sliding element 42, the sensor 60 generates signals to complete the circuit to use the whole panel 32 to display images.

In assembling the image display module, in reference to FIG. 3, the screen 30 is firstly secured in the socket 20. Then, the socket 20 is fastened onto the upper cover 50 via the screws 74 passing through the holes 2820 of the socket 20 and being screwed in the poles 5204 of the upper cover 50. The sensor 60 is fixed in the orifice 560 of the upper cover 50 with the inducing end 600 thereof facing towards the opening 58 of the upper cover 50. The operating element 44 is arranged on the shield 54 of the upper cover 50, the baffle 4442 of the operating element 44 is received in the opening 58 of the upper cover 50, and the two guiding rails 540 of the upper cover 50 are received in the two guiding grooves 4440 of the operating element 44. After that, the sliding element 42 is arranged under the shield 54 of the upper cover 50 and fixed to the operating element 44 via the screws 76 passing through the holes 4200 of the sliding element 42 and being engaged in the poles 4400 of the operating element 44. The shield 54 of the upper cover 50 is sandwiched between the sliding element 42 and the operating element 44. The rear peripheral wall 444 of the operating element 44 is adjacent to the front peripheral wall 524 of the frame 52 of the upper cover 50. The board 440 of the operating element 44 covers on the second portion 582 of the opening 58. Therefore, a part of the panel 32 is covered and the inner panel 320 is exposed via the first portion 580 of the opening 58. Lastly, the bulges 4242 of the sliding element 42 are received in the grooves 1420 (for the first position) in the arms 14 of the bottom cover 10. The upper cover 50 is fixed to the bottom cover 10 via the screws 72 passing through the holes 1200 of the bottom cover 12 and being engaged in the poles 5202 of the upper cover 50. This completes the assembling of the image display module, with the sliding portion 40 being at the first position, and the inducing end 600 of the sensor 60 being away from the plate 422 of the sliding element 42 (see FIGS. 1 and 5).

Figure 2:
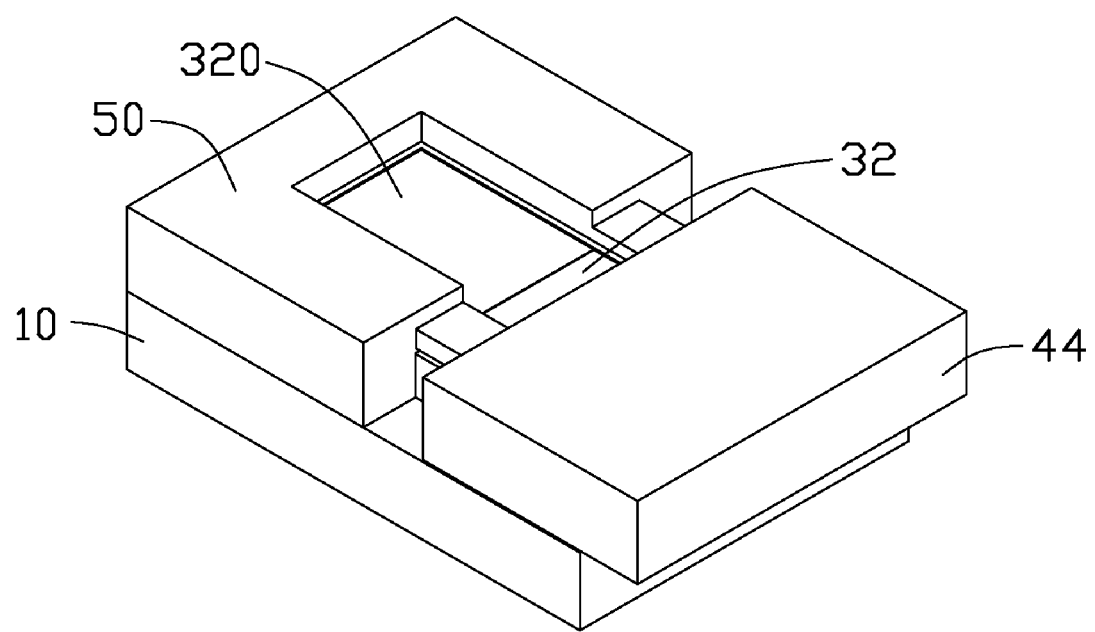
FIG. 2 is another isometric, assembled view of the image display module in FIG. 1, wherein the sliding portion is at a second position.

Referring to FIGS. 2 and 6, when the image display module needs to be switched to a wide screen mode, the operating element 44 can be pulled out to move away from of the upper cover 50 to the second position. To be specific, the bulges 4242 of the sliding element 42 are slid out of the grooves 1420 and received in the grooves 1422 of the arms 14 of the bottom cover 10. The second portion 582 of the opening 58 is uncovered by the operating element 44, and the whole panel 32 is then exposed out of the opening 58. When the operating element 44 is at the second position, the plate 422 of the sliding element 42 is in contact with the inducing end 600 of the sensor 60 to join the sensor 60 into the circuit so as to use the whole panel 32 to display images. The sliding portion 40 can be at the first position or the second position at the user's discretion for the screen to display images via either the inner panel 320 or the panel 32 respectively.

Understandably, the image display module of the present invention can be applied in other electronic devices such as mobile phones, digital camcorders, personal digital assistant devices (PDAs), game players, and so on.

It is believed that the present embodiments and their advantages will be understood from the foregoing description, and it will be apparent that various changes may be made thereto without departing from the spirit and scope of the invention or sacrificing all of its material advantages. The examples described herein are merely preferred or exemplary embodiments of the invention.

What is claimed is:

1. An image display module for displaying images in electronic devices, comprising:
   a bottom cover;
   a screen received in the bottom cover;
   an upper cover fastened and aligned to the bottom cover, the upper cover having an opening defined therein for exposing the screen and displaying images;
   a sensor on the upper cover, wherein the sensor is capable of engaging a circuit means at a position to control the size of the display area of the screen; and
   a sliding portion
   movably mounted on the bottom cover, wherein the sliding portion can stop at different positions relative to the bottom cover to expose different-sized portions of the screen, and wherein the sliding portion is capable of engaging the sensor together with the circuit means to control the size of the display area of the screen based on the position of the sliding portion;
   wherein the sensor is arranged on the upper cover, and a first position and a second position are defined for the sliding portion;
   wherein, when the sliding portion is at the first position, the sliding portion does not engage the sensor, the opening is partially covered by the sliding portion and a portion of the screen is exposed for displaying images, and
   when the sliding portion moves to the second position relative to the bottom cover, the opening is in its full size and the sliding portion engages the sensor which, in turn, engages the circuit means to use the full size of the screen to display images;
   wherein the bottom cover comprises a frame for receiving the screen therein and two arms extending inwardly from two opposite sides of the frame respectively, two grooves being defined in each of the arms for engaging with the sliding portion;
   wherein each of the arms comprises a hanging portion extending inwardly from one of the two opposite sides of the frame and a conducting portion extending upwardly from one end of the hanging portion, the two grooves being defined in an outer side of the conducting portion;
   wherein the sliding portion comprises a sliding element, the sliding element comprising a body and two locking blocks extending rearward from two ends of the body, each of the two locking blocks being movably mounted on the connecting portion of each of the arms;
   wherein each of the two locking blocks comprises a leg extending from one of the two ends of the body and a bulge formed inwardly at an end of the leg, the bulge being received in one of the two corresponding grooves of each of the arms of the bottom cover to securely lock the sliding portion at the first position or the second position; and
   wherein a positioning plate extends upwardly from a rear side of the body and positions between the two locking blocks, the positioning plate being capable of engaging or disengaging with the sensor when the bulge of each of the two blocks is alternatively received in one of the two corresponding grooves of each of the arms of the bottom cover.

2. The image display module as claimed in claim 1, further comprising a socket for receiving the screen therein, the socket being secured in the bottom cover and between the arms with the screen being located corresponding to the opening of the upper cover;
   wherein the upper cover comprises a frame connected to a rear portion of the bottom cover and a shield formed at a front side of the frame, and the opening comprises a first portion defined in a front portion of the frame and a second portion defined in a rear portion of the shield; and wherein the sliding portion further comprises an operating element movably mounted on the shield of the upper cover, the shield being sandwiched between the sliding element and the operating element.

3. The image display module as claimed in claim 2, wherein the sensor is secured on a front side of the shield, and when the sliding portion is at the first position, the operating element abuts against the frame of the upper cover to cover the second portion of the opening, and the sensor is away from the sliding element of the sliding portion; and when the sliding portion moves from the first position to the second position, the operating element of the sliding portion is away from the frame of the upper cover to enable the upper cover to open fully and the sensor engages the sliding element of the sliding portion which, in turn, engages the circuit means.

* * * * *